3,421,582
SECONDARY OIL RECOVERY PROCESS
Wayne S. Fallgatter, Tulsa, Okla., assignor to Cities Service Oil Company, Bartlesville, Okla., a corporation of Delaware
No Drawing. Filed Mar. 18, 1966, Ser. No. 535,355
U.S. Cl. 166—9    5 Claims
Int. Cl. E21b 43/20

ABSTRACT OF THE DISCLOSURE

In the secondary recovery of petroleum, separate surfactant-containing slugs are injected into the formation. One slug contains a surfactant in either oil or water. The other slug contains surfactant in a thickened water. Either of the slugs can be injected prior to the other. Improved oil recoveries are obtained.

---

This invention relates to the secondary recovery of oil from subterranean reservoirs. More particularly, it relates to a method for increasing the amount of oil recoverable by means of waterflooding.

In the secondary recovery of oil by waterflooding, the addition of various types of water thickening agents to increase the viscosity of the flood water improves the displacement ability of the flood water and reduces its tendency to "finger" through the more permeable portion of the reservoir. Likewise, the addition of surface active agents to the waterflood reduces the interfacial tension between the oil and floodwater and promotes the wettability of formation surfaces by water. The prior art has long recognized these advantages resulting from the use of water thickening agents or surface active agents in waterflooding. In addition, U.S. Patent 2,341,500, relating primarily to the use of a viscous liquid in waterflooding, discloses that small amounts of surface active agents may be added to or incorporated in the viscous liquid, since their detergent properties enhance the removal of residual oil from the formation.

The additives suggested by the prior art have, in general, increased the efficiency of waterflooding. The amount of additional oil recovered, however, has not been entirely satisfactory, and a considerable portion of the oil in the reservoir has remained unrecovered.

It is an object of this invention to provide an improved secondary recovery process for the production of oil from subterranean reservoirs.

It is a further object of this invention to provide an improved waterflooding process for recovering oil from petroleum-containing formations.

Other objects and advantages will appear from the following description of the invention, the novel features of which will be particularly pointed out hereinafter in the appended claims.

The objects of this invention are accomplished by an essentially two-step, or two-stage, treatment process. It is immaterial within the scope of the present novel invention which of the two treatment steps, to be discussed hereinafter, is employed first. The results obtained indicate that the amount of oil recovered from a subterranean formation is not affected by employing the treating steps in any particular sequence. The treatment steps of our novel invention consist essentially of (1) injecting into an input well a slug of surfactant in oil or water and (2) also injecting into the input well a slug of surfactant in water which has been thickened by an organic water thickening agent. Water which has been thickened by the addition thereto of an organic water thickening agent is referred to as "viscous water." In the treatment step involving the injection of a slug of surfactant in oil or water, the use of water or oil is simply a matter of choice, since the results obtained, as will be shown hereafter, in each instance are comparable.

The amount of oil recovered when employing the novel two-step treatment process is markedly improved over the results obtained when any other system is employed. Oil yield, expressed as percent pore volume (percent PV), was substantially increased by the present invention over the oil yield obtained when the following treatments were employed: (1) single treatment employing surfactant in water, (2) single treatment employing surfactant in oil, (3) double treatment employing surfactant in water, (4) double treatment employing surfactant in oil, (5) single treatment employing surfactant in viscous water and (6) double treatment employing surfactant in viscous water. The data substantiating the improved results obtained when employing the novel two-step treatment process as compared with the treatments enumerated above, will be presented hereafter.

Any efficient organic water thickening agent may be employed in accordance with this invention. An efficient water thickening agent is one that, when added in an amount within an allowable concentration range, will produce the necessary increase in the viscosity of the waterflood.

Crude oils generally have a viscosity falling within the range of from about 5 to about 20 cps. although the viscosities of crudes have varied from those as low as about 1 to 2 cps. to those ranging up to 1,000 cps. Such high viscosity crudes are very uncommon, however, particularly at reservoir temperatures.

A wide variety of water soluble polymers may be used to increase the viscosity of the water. For example, polymers such as methyl cellulose, starch, guar gum, gum tragacanth, sodium alginate, and gum arabic may be employed. Illustrative of the many commercially available water thickening agents that are suitable for use in accordance with this invention are: carboxymethyl cellulose, known as Hercules CMC 70–S Medium; carboxyvinyl polymer, known as Goodrich Carbopol 934; polyvinyl alcohol, known as Elvanol 50–42; polyacrylamide, known as American Cyanamide Cyanamer P–26. Particularly preferred among the water thickening agents are carboxymethyl cellulose and polyvinyl alcohol.

The organic water thickening agent which is selected may be added to either fresh water or to weak salt water in a concentration ranging from about 0.05% to about 4%, by weight, with a concentration of from about 0.1% to about 1% being preferred. The concentration of the surfactant which is employed in conjunction with the viscous water should be within the range of from about 0.3% to about 3%, by weight, with a preferred range being from about 0.5% to about 1%. The volume of surfactant and viscous water employed, as expressed in percent pore volume, should be within the range of from about 5% to about 50%, with a preferred range being from about 15% to about 25%. The viscosity of the surfactant and viscous water, as expressed in centipoises, should be within the range of from about 5 to about 100, with a preferred range being from about 10 to about 30.

The particular surfactant chosen to be employed in conjunction with the viscous water may be selected from a wide group of suitable surfactants. The surface active agent to be employed may be anionic, cationic, nonionic or a combination of these types. A more extensive discussion of the surface active agents which may be employed in both treatment steps, namely, surfactant in viscous water and surfactant in oil or water, will follow. Although the surface active agents which may be employed are discussed in relation to the surfactant in oil or water treatment, it is to be understood that these surface active agents may also be used in conjunction with the surfactant in viscous water treatment. However, a preferred surfactant for use in this particular treatment step, is a mixture of lauric acid diethanolamide (Trepoline L) and sodium tridecyl sulfate polyglycol ether, 30% active (Trepenol S 30T) employed in a ratio of 1 to 1.

The surfactant employed in the treatment step involving the addition of surfactant to water or oil may be selected from anionic, cationic, or nonionic surface active agents, or a combination of these types. Many surface active agents that are primarily oil soluble have sufficient water solubility to permit their use in aqueous solutions. Also, many primarily oil soluble anionic and cationic surfactants can be rendered primarily water soluble by neutralizing with organic acids or bases to form salts.

Illustrative of the various surfactants that can be employed in this invention are water soluble or water dispersible compounds such as alkyl aryl sulfonates, fatty alcohol ethylene oxide condensates, polyoxyethylated alkyl phenol, polyoxyethylene sorbitan fatty acid esters, glycerides of fatty acids, diethanolamine fatty acid condensates, quaternary ammonium halides, alkyl sulfates, and ethoxylated sulfates. Additional surface active agents that may be employed in accordance with this invention are listed in Soap and Chemical Specialties, in five parts, from December 1957 through April 1958.

Examples of suitable anionic surface active agents employed in the present invention include: sodium tridecyl sulfate polyglycol ether, 30% active, marketed as Trepenol S 30T; sodium petroleum sulfonate, marketed as Promor SS 20; amine dodecylbenzene sulfonate, marketed as Trepolate YLA; and sodium oleate. An example of a suitable cationic surfactant is dodecylbenzyl trimethyl ammonium chloride, marketed as Trepsan DBM. Examples of suitable nonionic surfactants are lauric acid diethanolamide, marketed as Trepoline L; polyoxyethylene sorbitan trioleate, marketed as Tween 85; nonyl phenoxy polyoxyethylene ethanol, marketed as Igepal CO 630. A preferred surfactant for use in this particular treatment step is a mixed of sodium petroleum sulfonate (Promor SS 20) and polyoxyethylene sorbitan trioleate (Tween 85) in a 7 to 3 ratio.

The concentration of surfactant employed in this particular treatment step, namely, addition of surfactant to oil or water, should be within the range of from about 1% to about 10%, by weight, whether the surfactant employed is a single surface active agent or a combination of surface active agents. It is preferred that the concentration of surfactant be within the range of from about 2% to about 5% by weight. The amount of surfactant to be employed, based on 100% active basis, as expressed in percent pore volume, should be within the range of from about 0.10% to about 0.65%, with a preferred range being from about 0.25% to about 0.35%. The volume of oil or water employed to dissolve the surface active agent or a combination of surface active agents, as expressed in percent pore volume, should be within the range of from about 3.5% to about 40%, with a preferred range being from about 5% to about 10%. The total volume of surfactant and oil, or surfactant and water, as the case may be, as expressed in percent pore volume, should be within the range of from about 3.5% to about 40%, with a preferred range being from about 5% to about 10%.

The specifically enumerated surface active agents which may be employed in conjunction with the treatment step involving the addition of surfactant to oil or water, may also be employed in the treatment step involving the addition of surfactant to viscous water, as was previously indicated.

Either of the two treatment steps may be employed prior to the other step, without in any way diminishing from the total amount of oil recovered. Various conventional driving fluids may be employed in the practice of this invention. It is preferred to employ an aqueous driving fluid, namely, either fresh water or salt water (5% NaCl). An aqueous driving fluid may be employed subsequent to the injection of both of the slugs comprising the two-step treatment process of the present invention. Optionally, an aqueous driving fluid may be injected intermediate to each of said treatment steps. In addition, prior to the employment of the first treatment step one may optionally employ an aqueous driving fluid. If the formation is driven two or three times, in the exercise of the available options, salt water may be employed as the aqueous driving fluid in each instance or fresh water may be employed in each instance, or sequences wherein the aforementioned driving fluids are varied may be employed. While the quantity of aqueous driving fluid employed in each water-flood is not critical, it is generally preferred to employ from about one-half (½) a pore volume to about three (3) pore volumes of driving fluid.

The following examples are given to further illustrate the practice of the present invention and are not intended to limit the scope of the invention as set forth in the appended claims.

Example I

A consolidated sandstone core measuring ten inches long and two inches in diameter was filled with water, then driven with oil until the fluid saturation expressed as percent pore volume was 63.4% Hawes crude. This was followed by an initial flood of about 1 pore volume of a 5% by weight NaCl solution. At this point the core contained 33.1% pore volume of residual oil. The core was then treated with a surfactant consisting of 10% by weight of Promor SS 20 and Tween 85, present in a ratio of 7/3, in a crude oil (Hawes). The size of the surfactant was 5.2% as expressed in percent pore volume and 0.4% active surfactant as expressed in percent pore volume. The core was then driven by 1.4 pore volumes of fresh water. The oil yield after this first treatment step was 19.8% expressed in pore volume. This was followed by the second treatment step which consisted of adding ½ a pore volume of a surfactant mixture consisting of 0.5% Trepoline L and 0.15% Trepenol S 30T to water which had been made viscous by the addition, thereto, of 1% of Hercules CMC 70–S Medium thickener. The second treatment was followed by a fluid drive consisting of 1.5 pore volumes of fresh water. The oil yield obtained subsequent to the second treatment as expressed in percent pore volume was 7.7%. The total yield of oil obtained from both treatments was 27.5% pore volume.

Example II

A consolidated sandstone core measuring ten inches long and two inches in diameter was filled with water, then driven with oil until the fluid saturation expressed as percent pore volume was 63.5% pore volume of Hawes crude. The core was then flooded with about 1 pore volume of fresh water, which left a residual oil content of 33.2% pore volume. The first treatment consisted of injecting 3% by weight of Trepoline L in fresh water (7.5% pore volume treatment size, 0.23% pore volume active surfactant). After the injection of the surfactant the core was flooded with 2 pore volumes of fresh water. The yield of oil obtained after this first treatment step, as expressed in percent pore volume, was 4.1%. The second step of the treatment consisted of adding ½ pore volume of 1% Trepoline L, based on the weight of the water, to water which had been thickened by the addition thereto of 3% Du Pont Elvanol 50–42 polyvinyl alcohol and injecting it into the core. After this second injection the core was flooded with 1.1 pore volumes of fresh water. The oil yield resulting after this second injection treatment was 23.3% pore volume. The total oil yield after both treatment steps was 27.4% pore volume.

Example III

A series of consolidated sandstone cores measuring ten inches in length and two inches in diameter was filled with water, then driven with Hawes crude oil. The cores were then flooded with a salt water flood (5% NaCl) until oil production ceased. At this point the cores contained approximately 33% pore volume of residual oil. The first treatment step was carried out by injecting a mixture of 10 wt. percent of Promor SS 20 and Tween 85 (present in a 7/3 ratio) in Hawes crude oil. The first treatment was followed by flooding with 1.4 pore volumes of fresh water. The second treatment followed the waterflood. The second treatment consisted of injecting water which had been made viscous by the addition thereto of 1% Hercules CMC 70–S Medium and into which was added a surfactant consisting of a 1% mixture of Trepoline L and Trepenol S 30T (30% active), said surfactant constituents being present in a 1/1 ratio. Subsequent to the second treatment step the core was flooded with 1.5 pore volumes of fresh water. The oil yields obtained after the first and second treatment steps and the total oil yield, all expressed in percent pore volume, when employing surfactant in oil as the first treatment step is tabulated in Table I below. This illustrates the maximum oil recovery per unit of surfactant.

TABLE I

| | First treatment, surfactant in oil | | Second treatment, viscous water + surfactant | | Yield, percent PV |
|---|---|---|---|---|---|
| | Size, percent PV | Oil Yield, percent PV | Size, percent PV | Oil Yield, percent PV | |
| 1 | 7.63 | 16.0 | 50 | 9.8 | 25.8 |
| 2 | 5.22 | 19.8 | 50 | 7.7 | 27.5 |
| 3 | 4.17 | 16.6 | 100 | 7.2 | 23.8 |
| 4 | 3.00 | 10.3 | 50 | 6.5 | 16.8 |
| 5 | 2.34 | 8.9 | 50 | 11.5 | 20.4 |
| 6 | 0.76 | 0.5 | 50 | 11.9 | 12.4 |
| 7 | None | None | 100 | 13.1 | 13.1 |
| 8 | 4.17 | 16.6 | None | None | 16.6 |

From Table I it can be seen that when either the first or second treatment step is not employed, as is illustrated in runs 7 and 8, the total oil recovered is considerably diminished. Comparing run 3 with run 8, it is apparent that when both treatment steps of the present invention are employed as compared with using only one of the treatment steps, and keeping the surfactant size constant, the two-step treatment process increases the total oil yield by 7.2% pore volume. Maximum recovery is obtained in the first treatment step when about 5.22% pore volume of surfactant is employed, as is illustrated by run no. 2.

Example IV

A series of consolidated sandstone cores measuring ten inches in length and two inches in diameter were filled with water and then driven with crude oil until the fluid saturated of the core as expressed in percent pore volume was 65% oil and 35% water. The cores were then flooded with 1 pore volume of salt water (5 wt. percent NaCl). The residual oil content of each of the cores at this point was approximately 33% PV. Whenever a single treatment of surfactant in oil, water or viscous water was used, the treatment was followed by flooding the core with 2 pore volumes of a fresh water driving fluid. Whenever a double treatment of surfactant in oil, water, or viscous water was used the core was flooded with 2 pore volumes of a fresh water driving fluid after the first treatment step and also after the second treatment step. Whenever a surfactant treatment in oil or in water was employed, the surfactant used was a mixture of Promor SS–20 and Tween 85 in a ratio of 7:3 and was used at a concentration between 3.3 and 5.5 wt. percent in water or oil. Whenever a single treatment of surfactant in oil or water is referred to, 0.4% PV of active surfactant was employed. Whenever a double treatment of surfactant in oil and water is referred to 0.2% PV of surfactant was used in each treatment making a total of 0.4% PV expressed as 100% active surfactant. Whenever a surfactant in viscous water treatment is referred to it indicates that ½ a pore volume of 1% CMC 70–S Medium thickener containing 1% of a mixture of Trepoline L and Trepenol S 30T in equal parts (1:1) was used.

TABLE II

| Type of Treatment | Oil yield, percent PV | | |
|---|---|---|---|
| | Treatments | | Total |
| | 1st | 2nd | |
| (1) Surfactant in water, single treatment | | | 16.0 |
| (2) Surfactant in water, double treatment | 12.8 | 0.7 | 13.5 |
| (3) Surfactant in water, followed later by surfactant in viscous water | 16.0 | 6.0 | 22.0 |
| (4) Surfactant in oil, single treatment | | | 16.6 |
| (5) Surfactant in oil, double treatment | 11.3 | 0.0 | 11.3 |
| (6) Surfactant in oil, followed later by surfactant in viscous water | 16.6 | 7.2 | 23.8 |
| (7) Surfactant in viscous water, followed later by surfactant in water | 14.4 | 6.8 | 21.2 |
| (8) Surfactant in viscous water, single treatment | | | 13.1 |
| (9) Surfactant in viscous water, double treatment | 7.0 | 10.9 | 17.9 |
| (10) Surfactant in viscous water, double treatment 1 PV each | 8.9 | 5.4 | 14.3 |
| (11) Surfactant in oil, followed later by surfactant in viscous water | 6.0 | 14.8 | 20.8 |

The improved and unexpected oil yields obtained, as expressed in percent pore volume, when employing the two-step treatment of the present invention is readily apparent from the above table. Both single and double treatments employing only water, oil, or viscous water, produced oil yields which were markedly below those obtained by the use of the novel two-step treatment process of the present invention.

While the invention has been described above with respect to certain embodiments thereof, it will be understood by those skilled in the art that various changes and modifications may be made without departing from the spirit and scope of the invention. It is intended that all such changes and modifications be covered by the appended claims.

Therefore what is claimed is:

1. A method for recovering petroleum oil from a subterranean formation which comprises:
   (a) injecting into an input well a treatment slug consisting of a surfactant in a liquid selected from the group consisting of oil in water, and also injecting into said formation a treatment slug of surfactant in water thickened by an organic thickening agent;
   (b) injecting a fluid drive intermediate to the injection of said treatment slugs, said fluid drive comprising an aqueous fluid selected from the group consisting of fresh water and salt water;
   (c) recovering crude oil displaced by said injections from said formation through an output well.

2. The method as recited in claim 1 wherein said treatment slug consisting of a surfactant in a liquid selected from the group consisting of oil and water is injected first into said formation.

3. The method as recited in claim 1 wherein said treatment slug of a surfactant in water thickened by an organic thickening agent is injected first into said formation.

4. The method of claim 1 in which a slug of surfactant in a liquid selected from the group consisting of oil and water is first injected into the input well, said surfactant concentration being from about 1% to about 10%, by weight, the amount of said surfactant being from 0.10% to about 0.65% pore volume; and in which the treatment slug comprising a surfactant in water thickened by an organic thickening agent has a surfactant concentration of from about 0.3% to about 3%, by weight, the amount of said water thickened by an organic thickening agent being from about 5% to about 50% pore volume, said organic thickening agent being present in a concentration of from about 0.05% to about 4%, by weight.

5. The method of claim 1 in which the first treatment slug comprises a surfactant in water thickened by an organic thickening agent, said surfactant concentration being from about 0.3% to about 3%, by weight, the amount of said water thickened by an organic thickening agent being from about 5% to about 50% pore volume, said organic thickening agent being present in a concentration of from about 0.05% to about 4% by weight; and said second treatment slug comprising a surfactant in a liquid selected from the group consisting of oil in water, said surfactant concentration being from about 1% to about 10%, by weight, the amount of said surfactant being from about 0.10% to about 0.65% pore volume.

References Cited

UNITED STATES PATENTS

| | | | |
|---|---|---|---|
| 2,341,500 | 2/1944 | Detling | 166—9 |
| 3,018,826 | 1/1962 | Sandiford | 166—9 |
| 3,044,544 | 7/1962 | Holbrook et al. | 166—9 |
| 3,246,694 | 4/1966 | Taber et al. | 166—9 |
| 3,254,714 | 6/1966 | Gogarty et al. | 166—9 |
| 3,292,696 | 12/1966 | Sandiford | 166—9 |
| 3,308,883 | 3/1967 | Foster | 166—9 |

STEPHEN J. NOVOSAD, *Primary Examiner.*